United States Patent [19]

Myers

[11] Patent Number: 4,893,263

[45] Date of Patent: Jan. 9, 1990

[54] SUPPORT APPARATUS FOR PORTABLE COMPUTER EXPANSION UNIT

[75] Inventor: Stephen M. Myers, Houston, Tex.

[73] Assignee: Compaq Computer Corporation, Houston, Tex.

[21] Appl. No.: 13,649

[22] Filed: Feb. 12, 1987

[51] Int. Cl.[4] .............................................. G06F 1/00
[52] U.S. Cl. .................................................... 364/708
[58] Field of Search ..................... 364/708; 174/52 R; 361/331, 380, 390, 392, 397

[56] References Cited

U.S. PATENT DOCUMENTS 4,680,674 7/1987 Moore ................................. 364/708
4,788,658 11/1988 Hanebuth ............................ 364/708

OTHER PUBLICATIONS

Petzold, C., Wiswell, P., and Rosch, W., "Enlarging the Dimensions of Memory", *PC Magazine*, vol. 5, No. 1, pp. 120-134, Jan. 14, 1986.

Rosch, W., "Sliding in Memory—14 Hard Disk Cards", *PC Magazine*, vol. 6, No. 3, pp. 195-219, Feb. 10, 1987.

*IBM PC Convertible Guide to Operations,* First Edition, (Feb. 1986), pp. 2-1-2-3.

Logicsoft advertisement page from *PC Magazine,* 2/10/87.

SF MICRO advertisement page from PC Week magazine, Dec. 23/30, 1986.

*Primary Examiner*—Gary V. Harkcom
*Assistant Examiner*—Long T. Nguyen
*Attorney, Agent, or Firm*—J. David Cabello; Christopher D. Keirs

[57] ABSTRACT

A support apparatus for a portable personal computer expansion unit provides a plurality of interlocking ribs on the mating surfaces of the portable personal computer and expansion unit, and a latch mechanism to releasably lock the mating surface of the computer expansion unit to the mating surface of the portable personal computer.

7 Claims, 2 Drawing Sheets

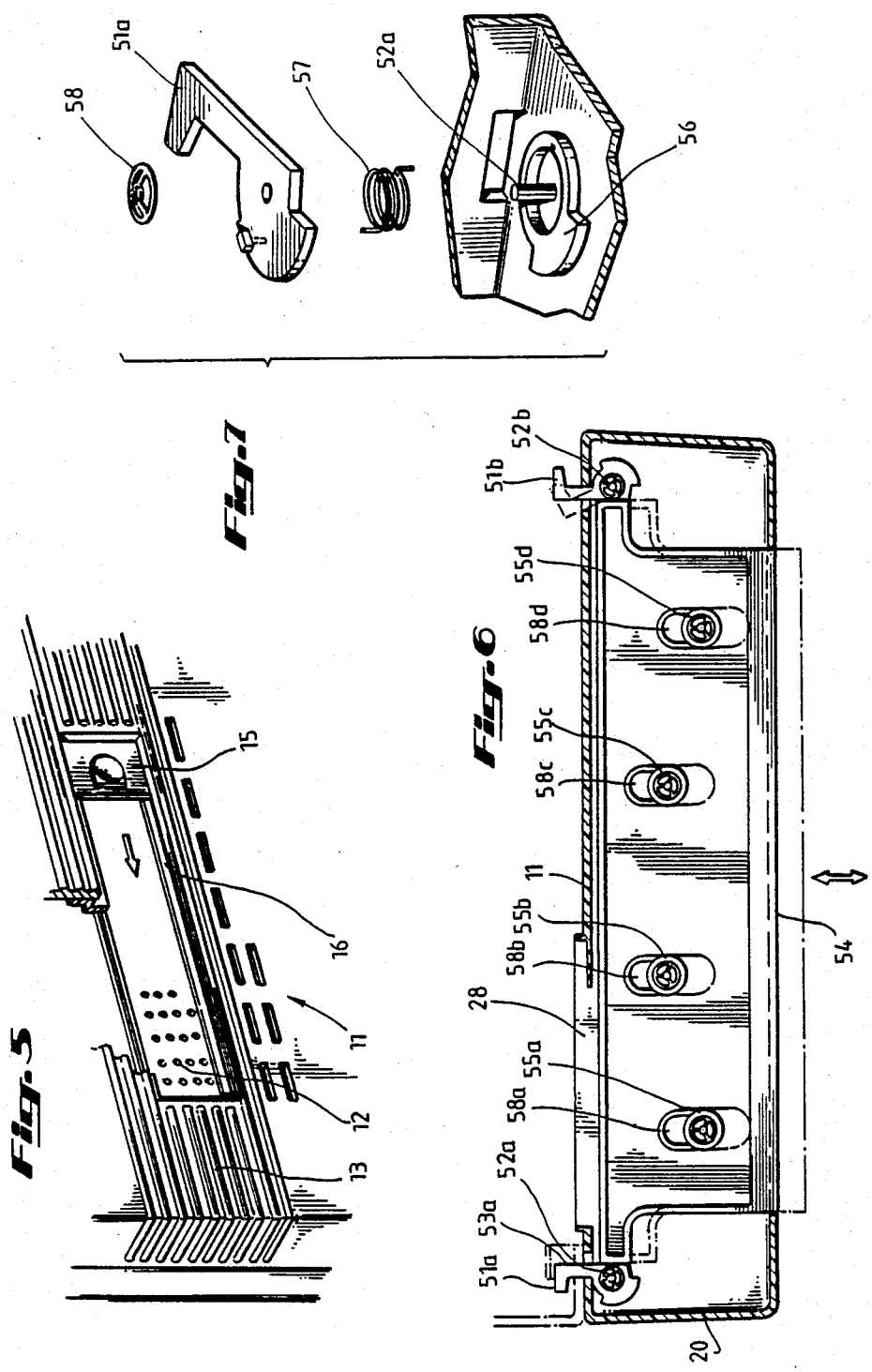

SUPPORT APPARATUS FOR PORTABLE COMPUTER EXPANSION UNIT

BACKGROUND OF THE INVENTION

This invention relates generally to portable computer expansion units and more specifically to an apparatus for attaching an expansion unit to the outer surface of a portable personal computer for transportability of the computer and expansion unit as an integral unit.

DESCRIPTION OF THE RELATED ART

Expansion units for portable personal computers generally have included printed circuit boards or cards which may be connected to a portable personal computer for memory expansion, storage including hard disks, or other forms of increased storage capacity which may be installed simply by plugging the expansion unit board or card into an expansion slot in the main body of the computer. Other peripheral devices in the general category of expansion units include modems, printers, and outboard disk drives which as a general rule are stand-alone devices which are not physically attached to the computer except by means of wires or cables.

Generally, expansion units may be either internal, that is, plugged into an expansion slot in the body of a portable personal computer, or external. A problem with an internal expansion unit is that after the unit is inserted in an expansion slot of the computer, the expansion unit may not be disconnected easily. An external expansion unit such as a "Bernoulli box", may be connected to the portable personal computer via an external cable and one or more multi-pin electrical connectors. An external expansion unit itself is a separate and distinct component and is not integrally attached to the body of the portable personal computer. Therefore, it may be inconvenient to transport both the portable personal computer and the external expansion unit together. The use of an external expansion unit thus detracts from one of the primary advantages of portable personal computers: portability.

It has been proposed that an expansion unit be connected to the computer in such a way that the expansion unit connected to the portable personal computer may be moved together as a unit while the expansion unit remains electrically connected and firmly attached to the outer surface of the computer. For example, there presently exists portable personal computers that include optional expansion units which are electrically connected via multi-pin connectors to the computer and physically attached to the outer surface of the computer. However, with such expansion units a problem has arisen in that the weight of the expansion unit results in stress placed on the multi-pin connectors. This problem is due to the lack of a secure and solid apparatus for physically attaching the expansion unit to the outer surface of the portable personal computer while maintaining electrical connections during transportation of the computer and expansion unit together. The stress on the multi-pin connectors results in problems in data signals between the portable personal computer and the expansion unit. Such problems in the connection between the portable personal computer and the expansion unit are extremely undesirable, particularly when the expansion unit is used for additional memory or storage.

SUMMARY OF THE INVENTION

It is a major object of the invention to provide a support apparatus for a computer expansion unit solving the above problems. That is, an object of the invention is to provide an expansion unit which may be integrally attached to the outer surface of a portable personal computer and will prevent stress on the multi-pin connectors between the portable computer and the expansion unit. It is a further object of the present invention to provide an expansion unit having a solid outer shell for protecting the electronic components and permitting quick connection or disconnection to a portable personal computer without risk of damage to the electronic components in the expansion unit. The electronic components in the expansion unit may include additional memory, storage devices such as hard storage cards, modems, networking cards, and graphics adapters or other peripheral devices well known in the art.

According to the present invention, the support apparatus for a computer expansion unit includes a portable computer frame having a first set of horizontal ribs on a first mating surface, and a computer expansion unit having a second set of horizontal ribs which interlock with the first set of ribs. The interlocking ribs thus provide support for the computer expansion unit and help prevent undesirable stress on the multi-pin connectors between the portable personal computer and the expansion unit.

The support apparatus further includes a latch mechanism to releasably lock the computer expansion unit to the outer surface of the portable personal computer. The latch mechanism includes a set of hinged hooks for quickly connecting or disconnecting from corresponding slots in the outer surface of the portable personal computer. Thus, according to the present invention, a support apparatus is provided which securely holds an expansion unit against the surface of the portable personal computer and may be transported as one integral unit along with the portable personal computer without any risk of stress on the multi-pin connectors.

These and other objects and advantages of the invention, as well as the details of illustrative embodiments, will be more fully understood from the following description and drawings, in which:

BRIEF DESCRIPTION OF THE DRAWINGS

FIG. 5 is a perspective view of a portion of the rear panel of the portable personal computer showing a moveable panel for covering a multi-pin connector;

FIG. 6 is a cross section view taken along the lines 6—6 of FIG. 1 showing an expansion unit according to the present invention;

FIG. 7 is an exploded perspective view of the latch hook according to a preferred embodiment of the present invention.

DETAILED DESCRIPTION OF THE PREFERRED EMBODIMENT

Figure 1:
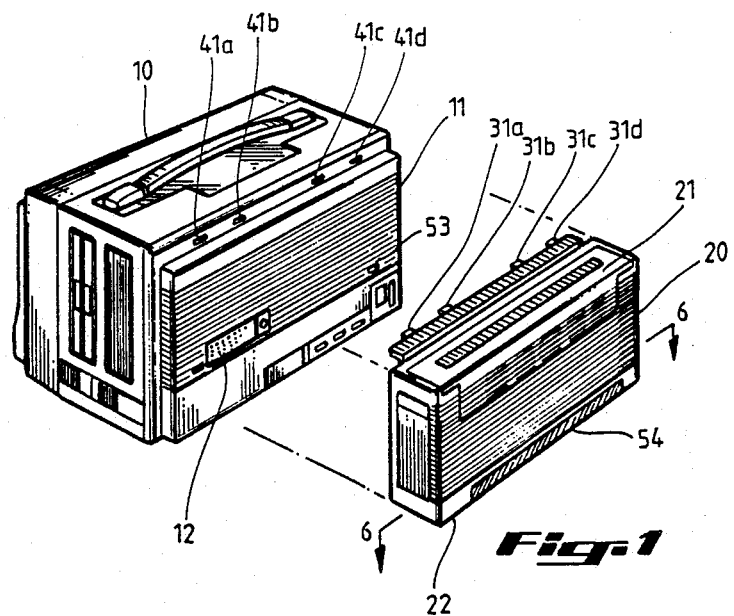
FIG. 1 is a perspective view of the portable personal computer with an expansion unit electrically disconnected and unattached from the outer surface of the computer.

Now referring to the drawing and FIG. 1 thereof, a portable personal computer 10 is shown having a rear panel 11 and a multi-pin connector 12 located generally at the rear of the computer. An expansion unit 20 is also shown in FIG. 1 disconnected and physically unattached to the computer surface. The expansion unit 20 has a top surface 21 and a bottom surface 22 and may enclose a variety of peripheral expansion devices including additional memory, hard disk storage devices, a modem, a networking card, or other peripheral devices well known in the art.

Figure 2:
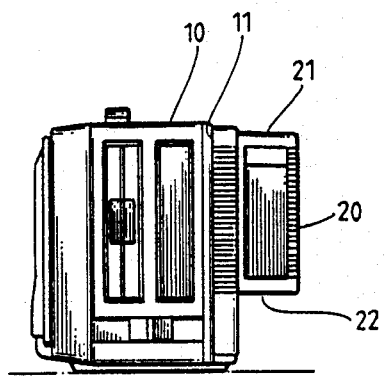
FIG. 2 is a side view of a portable personal computer according to the present invention with an expansion unit electrically connected and physically attached to the outer surface of the computer.

Now referring to FIG. 2 the expansion unit 20 is shown securely attached to the outer surface of the portable computer 10 according to the present invention. The portable computer 10 together with the expansion unit 20 firmly affixed to the rear panel 11 of the computer may be securely and easily moved as an integral unit without risk of damage to the expansion unit 20 or the multi-pin connectors providing electrical connection between the portable personal computer and the expansion unit.

Figure 3:
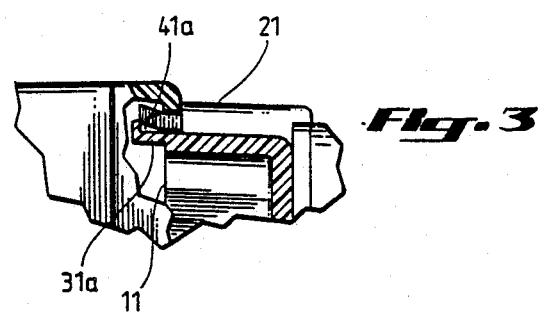
FIG. 3 is a side view, partially in section, of a tab in the expansion unit and corresponding slot in the rear panel of the portable personal computer.

As shown in FIG. 1 and FIG. 3, one or more tabs 31a–31d are included near the top surface 21 of the expansion unit 20. The tabs 31a–31d fit within corresponding slots 41a–41d in the rear panel 11 of the portable computer 10.

Figure 4:
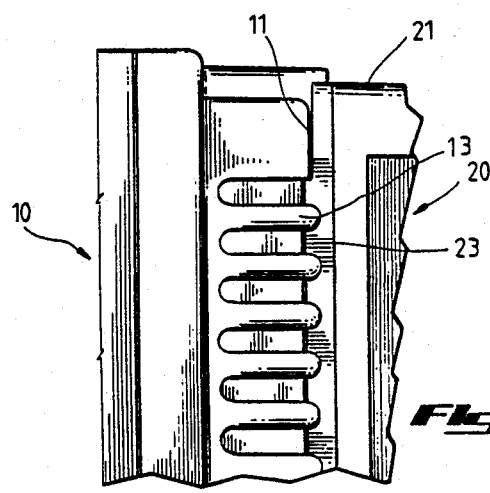
FIG. 4 is a side view of a portion of an expansion unit connected to the portable personal computer showing the interlocking rib structure according to the present invention.

The interlocking rib structure of the portable personal computer and expansion unit is shown in FIG. 4. The rear panel 11 of the portable personal computer includes horizontal rear panel ribs 13 having ridges and troughs. The expansion unit includes matching horizontal ribs 23 which interlock in the troughs between the ribs 13 of the portable personal computer. When the expansion unit 20 is attached to the rear panel of the portable personal computer, the interlocking ribs provide vertical support so that stress is not placed on the multi-pin connectors. The ribs also provide a means of matching the expansion unit 20 at an appropriate location with respect to the rear panel 11 of the portable personal computer 10. It will be understood that an expansion unit according to the present invention may be placed at various locations with respect to the outer surface of the portable computer according to the present object of the invention. It is not essential that the expansion unit be placed on any particular surface of the portable personal computer. Furthermore, several expansion units may be used according to the present invention utilizing the same rib structure and interlocking means without departing from the present invention.

Now referring to FIG. 5, the horizontal ribs 13 are shown in the rear panel 11 of the portable computer 10. Also shown in FIG. 5 is a moveable door 15 which, in a preferred embodiment, is slidable in a track 16 to expose the computer multi-pin connector 12 for connection to the corresponding multi-pin connector through opening 28 of the expansion unit 20. In a preferred embodiment, the moveable door 15 will protect the computer multi-pin connector 12 from exposure when the corresponding multi-pin connector of the expansion unit 20 is not connected to the computer 10.

As shown in FIG. 6, the latch mechanism located generally at the bottom surface 22 of the expansion unit 20 includes one or more latch hooks 51a–51b which pivot about an axis or shaft shown as 52a–52b. As can be seen in FIG. 6, latch hook 51a is secured within a corresponding latch slot 53 (see FIG. 1) in the rear panel 11 of the portable personal computer 10. The latch release bar 54 is slidable to firmly clamp the latch hooks 51a–51b in a locked or hooked position. The latch release bar 54 further includes a plurality of clamps 55a–55d which are slidable within clamp slots 58a–58d as the bar 54 is moved between the locked and the released positions. To disconnect the expansion unit 20 from the computer 10 the latch release bar 54 is moved into the released position wherein the latch hooks 51a–51b are biased to pivot out of the latch slot such as 53 and the expansion unit 20 then may be disconnected from the portable personal computer 10. Also shown in FIG. 6 is an opening 28 for the multi-pin connector of the expansion unit 20.

Now referring to FIG. 7, an exploded view of the latch hook mechanism is shown. The latch hook mechanism includes latch hook 51a, which pivots about the shaft or axis 52a, and the latch stop 56. A latch spring 57 may be used to bias the latch hook 51a into an open or released position with respect to a latch slot 53. A clamp 58 is used to hold together the latch hook 51a, latch spring 57, shaft 52a and latch stop 56.

The expansion unit 20 is firmly secured to the portable personal computer 10 with tabs 31a–31d at the top surface 21 of the expansion unit while the latch hook mechanism operates to connect or disconnect the bottom surface 22 of the expansion unit. According to the present invention, the expansion unit 20 may be easily connected or disconnected to the outer surface of the computer, without undesirable stress on the multi-pin connectors of the expansion unit and the computer. The interlocking ribs, tabs and latch mechanism provide a secure support apparatus so that in transportation of the portable personal computer, the expansion unit may remain connected to the computer as an integral unit.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. A support apparatus for a computer expansion unit said support apparatus comprising:
   a computer frame having a first mating electrical connector and a first set of horizontal ribs on a first mating surface;
   a computer expansion unit having a second mating electrical connector and a second set of horizontal ribs on a second mating surface, the second set of ribs being sized and positioned to engage the first set of ribs such that the first mating surface of the computer frame provides support by way of the engagement of the sets of ribs for the second mating surface of the computer expansion unit when the fist mating electrical connector is connected to the second mating electrical connector; and
   the computer expansion unit having means for releasably locking the second mating surface of the computer expansion unit to the first mating surface of the computer frame.

2. The support apparatus of claim 1 wherein the locking means comprises:
a plurality of tabs extending from a first edge of the second mating surface of the computer expansion unit;
a plurality of first slots in the first mating surface of the computer frame, the tabs being insertable into the first slots to hold the computer expansion unit in close relation to the first mating surface of the computer frame;
a plurality of hinged hooks extending from a second edge of the second mating surface of the computer expansion unit;
a plurality of second slots in the first mating surface of the computer frame; and
slideable means to move the hooks simultaneously into either a locked position to hold the computer expansion unit in close relation against the first mating surface of the computer frame or an unlocked position with respect to the second slots to release the computer expansion unit.

3. The support apparatus of claim 2 wherein the slideable means comprises a bar movable towards and away from the second mating surface of the computer expansion unit;
the bar having a first and a second longitudinal edge, the second longitudinal edge pushing the hinged hooks into the locked position when the bar is moved towards the second mating surface; and
bias means to urge the hinged hooks into the unlocked position when the bar is moved away from the second mating surface.

4. The support apparatus of claim 1 further comprising a movable door to provide access to the first mating electrical connector.

5. The support apparatus of claim 1 wherein in each set of rigs, each rib comprises a substantially flat top portion and a substantially curved trough portion adjoining an adjacent rib.

6. A support apparatus for a computer expansion unit comprising:
a computer frame having a first mating electrical connector and first mechanical support means on a first mating surface;
a computer expansion unit having a second mating electrical connector and second mechanical support means on a second mating surface, the second mechanical support means interconnecting with the first mechanical support means whereby the first mating surface of the computer frame provides support for the second mating surface of the computer expansion unit when the first mating electrical connector is connected to the second mating electrical connector; and
the computer expansion unit having means for releasably locking the second mating surface of the computer expansion unit to the first mating surface of the computer frame.

7. The support apparatus of claim 6 wherein the first and second mechanical support means comprise a first and a second set of horizontal ribs, the second set of ribs being sized and positioned to engage the first set of ribs.

* * * * *